United States Patent
Daniel

(10) Patent No.: US 6,793,401 B2
(45) Date of Patent: Sep. 21, 2004

(54) SYSTEM AND METHOD FOR ASSEMBLING A BUNDLE OF CONDUCTORS INTO A CONNECTOR

(75) Inventor: Jose Daniel, Lewisville, TX (US)

(73) Assignee: The Boeing Company, Seattle, WA (US)

(*) Notice: Subject to any disclaimer, the term of this patent is extended or adjusted under 35 U.S.C. 154(b) by 69 days.

(21) Appl. No.: 10/225,698

(22) Filed: Aug. 22, 2002

(65) Prior Publication Data

US 2004/0037508 A1 Feb. 26, 2004

(51) Int. Cl.[7] .................................................. G02B 6/40
(52) U.S. Cl. ........................................ 385/54; 29/721
(58) Field of Search ............................. 385/53, 55, 70, 385/75, 54; 29/721, 739, 747

(56) References Cited

U.S. PATENT DOCUMENTS

| | | |
|---|---|---|
| 3,611,544 A | 10/1971 | Frels et al. |
| 3,706,134 A | 12/1972 | Sweeney et al. |
| 3,731,363 A | 5/1973 | Hall et al. |
| 3,932,931 A | 1/1976 | Wright |
| 4,127,936 A | 12/1978 | Schlup et al. |
| 4,727,637 A | 3/1988 | Buckwitz et al. |
| 4,849,743 A | 7/1989 | Ohno |
| 5,198,983 A | 3/1993 | Blake et al. |
| 5,590,457 A | 1/1997 | Ninchi |
| 5,682,672 A | 11/1997 | Taniguchi et al. |
| 5,871,373 A | 2/1999 | Pacini et al. |
| 6,375,362 B1 | 4/2002 | Heiles et al. |

FOREIGN PATENT DOCUMENTS

EP 0 242 876 A2 10/1987

*Primary Examiner*—Khiem Nguyen
(74) *Attorney, Agent, or Firm*—Alston & Bird LLP

(57) ABSTRACT

A system and method are provided for assembling of a bundle of conductors into a connector that defines a plurality of cavities for receiving the conductors. The system includes an apparatus that has a plurality of mating connectors that each include a plurality of cavities. The connector is capable of being removably coupled to one of the mating connectors such that the cavities of the mating connector are optically coupled with the cavities of the connector. The apparatus also includes a plurality of light emitting elements optically coupled to the cavities of the mating connectors. The light emitting elements can therefore selectively illuminate the cavities of the mating connectors. The system also includes a processing element capable of controlling operation of the light emitting elements. Also, the processing element includes a display capable of indicating the at least one cavity being illuminated.

23 Claims, 10 Drawing Sheets

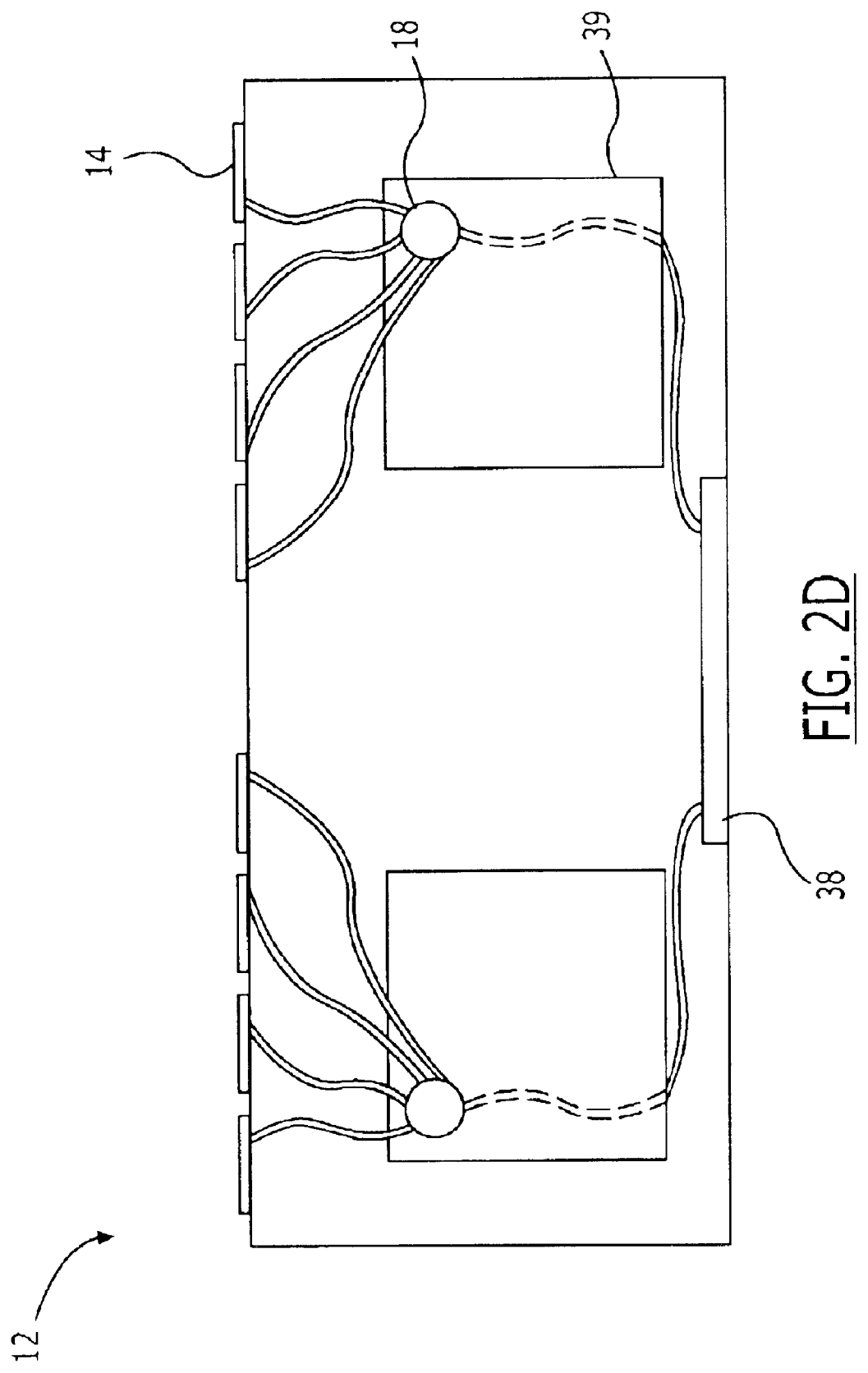

| | | | | |
|---|---|---|---|---|
| | Optical Plugging System   FIRST END | | | |
| | File   Edit   View   Connector   Options | | | |
| | W7509-703 747   Temp Code: A   Equip:   D17334P   Group: BD   Wires
RL671           Hyd Fluid:  N   Process: BAC 5162-5   ADCN: BASE   55 | | | |

Loaded Bundle: W7509-703

| | EQUIPMENT | EQ GROUP | CONNECTOR PART NUMBER |
|---|---|---|---|
| ▷ | D17334P | BD | BACC45FT22-55S7 |
| | D20016P | BC | BACC45FT18-31S9 |

Wire List

Notes

Wire Number

[    ] [GO]

Wire List

| WIRE_NO | COLOR | TERM |
|---------|-------|------|
| 003 |  | 8 |
| 007 |  | 11 |
| 008 |  | 12 |
| 009 |  | 13 |
| 010 |  | 14 |
| 011 |  | 15 |
| 012 |  | 16 |
| 013 |  | 17 |
| 014 |  | 18 |
| ▷ 015 |  | 19 |
| 016 |  | 20 |
| 017 |  | 21 |
| 018 |  | 22 |
| 019 |  | 23 |

FIG. 3D

SYSTEM AND METHOD FOR ASSEMBLING A BUNDLE OF CONDUCTORS INTO A CONNECTOR

FIELD OF THE INVENTION

The present invention relates generally to systems and methods of assembling a connector and, more particularly, relates to systems and methods of assembling a connector utilizing illumination of the cavities of the connector.

BACKGROUND OF THE INVENTION

A connector is generally mounted upon the end portions of a plurality of conductors, such as optical fibers, electrically conductive wires or the like. The connector may then be mated with another connector to connect respective bundles of the conductors. Alternatively, the connector may be connected to a receptacle of an instrument or the like.

It is conventional for each connector to comprise a mating shell (suitably cylindrical in shape), which is mechanically connected to the shell of the other connector when the two connectors are brought into operative relationship. Each connector also includes a contact receiving insert. The insert is typically made of dielectric material and is in the form of a plate having an inner surface which confronts the corresponding insert of the other connector, and an opposite, outer surface which is parallel to the inner surface. Numerous holes penetrate this member, opening at their opposite ends at the inner and outer surfaces respectively of the insert.

In instances in which the conductor is a wire, the wire is prepared for attachment to the connector by stripping the dielectric sleeve from the end of the wire so as to expose the conductive core, and crimping a contact onto the conductor. This contact may be in the form of a pin or a receptacle. The contact is introduced into a hole in the aforementioned insert by way of the outer surface thereof and, in the case of a pin, projects beyond the inner surface of the insert. When all the wires have been attached to respective connectors and the connectors are brought into mating relationship, the contacts that are received in the holes of one insert are physically engaged by the contacts that are received in the holes of the other insert. Thus, the connectors typically do not have pins or receptacles other than those that are physically attached to the wires before introduction into the holes of the insulating insert.

When attaching a bundle or breakout of conductors from a wiring harness or the like to a connector, it is necessary to insure that the conductors are located in the proper holes of the insert, since otherwise the proper circuits will not be completed when the connector is coupled to its mating connector. One method of insuring that the contacts are positioned in the proper holes involves the use of a plug map. Each hole in the insert is numbered and each conductor carries at its end a label or tag which bears an identifying number for the conductor. (It will be understood that the term "number," when used to identify a hole or a conductor, is not restricted to a numerical designation but may also include letter designations and mixed alphanumeric designations. The "number" may be encoded, e.g. on a bar code label.) The plug map correlates the conductor numbers with the hole numbers. The user selects a conductor for attachment to the connector, reads the conductor number, consults the plug map to find the number of the hole associated with the selected conductor, scans the plug to locate that hole, and inserts the contact of the selected conductor into the hole. Generally, the conductors are selected at random from the bundle that is to be assembled to the connector. Therefore, use of a plug map is subject to a disadvantage in that it involves carrying out a random search of the plug map for the conductor number and then searching the connector itself to find the corresponding hole. Consequently, attaching the conductors to the connector using a plug map in this manner is time consuming, and is subject to error, in that each conductor number may have six or more characters, and it is therefore easy to confuse the conductor numbers on the plug map. Moreover, even when the hole number has been found on the plug map, the density of holes on the connector itself might be such that it is easy to confuse one hole or aperture location for another.

In an automated robotic connector assembly machine, the operations of wire stripping, contact crimping and insertion are performed fully automatically. However, the wires must first be dressed into predetermined locations in a fixture. Therefore, this technique incurs a high cost while still involving manual labor.

Another technique for properly positioning conductors within a conductor is a cable scan system. In a cable scan system, the operator touches the contact of a selected wire to an electrode which receives a signal over the conductor. This signal represents the wire number in encoded form, and is decoded and applied to an electronic lookup table. The lookup table contains the plug map and provides the operator with the hole number without its being necessary for the operator to scan a plug map. However, this system is only applicable when the opposite end of the selected wire is connected to a signal source, i.e., has already been attached to its own connector, and does not relieve the operator of the burden of searching the insert plate for the hole having the number provided by the lookup table.

Several methods have been proposed for assisting in identifying the correct hole for receiving a particular conductor. U.S. Pat. No. 3,706,134 to Sweeney et al. addresses the problem of locating the correct hole number, particularly when the density of holes is high and the numbers imprinted on the connector are small. The connector is fitted over an array of optical fibers such that the fibers are positioned beneath respective holes. An input panel is also provided that constitutes an enlarged replica of the connector. The input panel includes a number of apertures, one corresponding to each hole of the connector. The optical fibers extend between the apertures in the panel and the corresponding holes in the connector. Therefore, when light is injected into an aperture of the panel, the light is transmitted by the respective optical fiber and emitted from the corresponding hole in the connector. The operator is then able to identify the holes by reference to the much larger panel, which facilitates correct identification of the holes. However, this does not relate to the difficulty associated with searching a plug map, and moreover because connectors may be quite long and the holes are quite narrow, it can be difficult to see which hole is in fact emitting light except by peering directly down the hole.

Another method is described by U.S. Pat. No. 3,932,931 to Wright, which discloses an apparatus for inserting posts into apertures in a circuit board. The circuit board is held in a horizontal plane over a vertically-disposed anvil assembly. The circuit board is movable in the horizontal plane relative to the anvil assembly. Above the circuit board and vertically aligned with the anvil assembly is a post insertion machine. In order to aid in proper positioning of the board for insertion of a post by the post insertion machine, a light source is mounted to direct a beam of light downwardly towards the anvil assembly. The anvil assembly comprises a necked housing in which an anvil finger is slidingly fitted. The finger is biased upwardly to project beyond the necked housing. When the board is properly positioned, the anvil finger enters a post receiving aperture of the circuit board. A visual indication that the circuit board is properly positioned with an aperture axially aligned with the post insertion machine and the anvil assembly is provided by reflection of light from the top surface of the anvil finger.

According to yet another method, described by U.S. Pat. No. 4,727,637 to Buckwitz et al., a workstation is provided that includes an adapter plate compatible with a connector, and the connector is coupled to the adapter plate. To fit a contact attached to a wire within a hole of a connector, the wire to which the contact is attached is first identified. The location of the hole that is to receive the contact is determined automatically from an electronic data lookup table. A signal is then provided to position an end portion of a fiber optic rod in line with the correct hole of the connector, where the opposite end of the fiber optic rod is optically coupled to a source of light. The end portion of the fiber optic rod is positioned by moving the rod in line with the correct hole, such as by a servo-motor. The fiber optic rod can then be advanced so that it enters the hole and projects from the opposite side of the connector identifying the correct hole. As such, light emitted from the fiber optic rod can facilitate visual identification of the hole from which the rod is projecting. Thereafter, the fiber optic rod is retracted, and the contact is inserted into the hole. Other methods employing light sources for guiding placement of components are described in U.S. Pat. No. 3,611,544 to Frels et al; U.S. Pat. No. 3,731,363 to Hall et al.; and U.S. Pat. No. 4,127,936 to Schlup et al.

While various methods for assisting in the placement of conductors within a connector have been provided, each method suffers from one or more shortcomings. For example, the apparatuses described by U.S. Pat. No. 3,706,134 to Sweeney et al. and U.S. Pat. No. 3,932,931 to Wright require somewhat complex devices to locate the holes in the connector. As such, it would be desirable to provide an improved system and method for facilitating the connectorization of a plurality of conductors, such as optical fibers, wires or the like.

SUMMARY OF THE INVENTION

In light of the foregoing background, the present invention provides an improved system and method of assembling a bundle of conductors into a connector that defines a plurality of cavities for receiving the conductors. Advantageously, the system and method of embodiments of the present invention provide an apparatus that includes a plurality of mating connectors. As such, the system and method of embodiments of the present invention do not require adaptors such that the apparatus can be configured for connectors of different types. Also, the mating connectors include cavities that are optically coupled to a plurality of light emitting elements to thereby provide for selective illumination of the cavities.

As the cavities are optically coupled to a plurality of light emitting elements, the system and method do not require any moving parts, such as a servo-motor, to selectively illuminate the cavities. Further, the system and method of embodiments of the present invention can display an indication of the cavity of the connector being illuminated. Thus, the system can facilitate assembling the bundle by not only illuminating the cavities of the connector, but by also providing a displayed indication of the cavities as the cavities are plugged with respective conductors from the bundle.

According to one aspect of the present invention, a system is provided for facilitating the assembly of a bundle of conductors into a connector that includes a plurality of cavities for receiving the conductors. The system includes an apparatus that has a plurality of mating connectors that each include a plurality of cavities. In this regard, the connector is capable of being removably coupled to one of the mating connectors such that coupling the connector to the mating connector optically couples the cavities of the mating connector with the cavities of the connector.

The mating connectors can include at least one plug mating connector and at least one receptacle mating connector. The connector, then, is selected from either a plug connector or a receptacle connector. As such, the plug mating connector is capable of being removably coupled to a receptacle connector, and the receptacle mating connector is capable of being removably coupled to a plug connector. Also, for example, the mating connectors can include at least two connectors of different types, wherein the connector is capable of being removably coupled to the mating connector of the same type as the connector.

The apparatus also includes a plurality of light emitting elements optically coupled to the cavities of the mating connectors, such as via a plurality of optical fibers. By optically coupling the light emitting elements to the cavities, the light emitting elements are capable of selectively illuminating at least one of the cavities of the mating connectors. To control the light emitting elements, the system includes a processing element. More particularly, the processing element is adapted to receive a selection of a conductor and thereafter control the light emitting elements to selectively illuminate a corresponding cavity of one of the mating connectors. Illuminating the cavities of the connector, in turn, facilitates plugging at least one associated conductor into the at least one illuminated cavity of the connector.

To further facilitate plugging the conductors into the cavities, the processing element can drive a display capable of indicating the at least one cavity being illuminated. For example, the display can be capable of displaying a graphical representation of the connector including the cavities and indicating the at least one cavity being illuminated. Additionally, the display can be further capable of indicating at least one cavity including a previously plugged conductor and/or at least one cavity including a filler plug. In addition to presenting the graphical representation of the connector, the display can also present a listing of the conductors and associated cavities of the connector such that the processing element can receive the selection from the listing. And prior to displaying the listing, the processing element can receive an identification of the bundle of conductors and thereafter display the listing of conductors and associated cavities based upon the identified bundle.

According to another aspect of the present invention, a method is provided for assembling a bundle of conductors into a connector that includes a plurality of cavities for receiving the conductors.

BRIEF DESCRIPTION OF THE DRAWINGS

Figure 1:
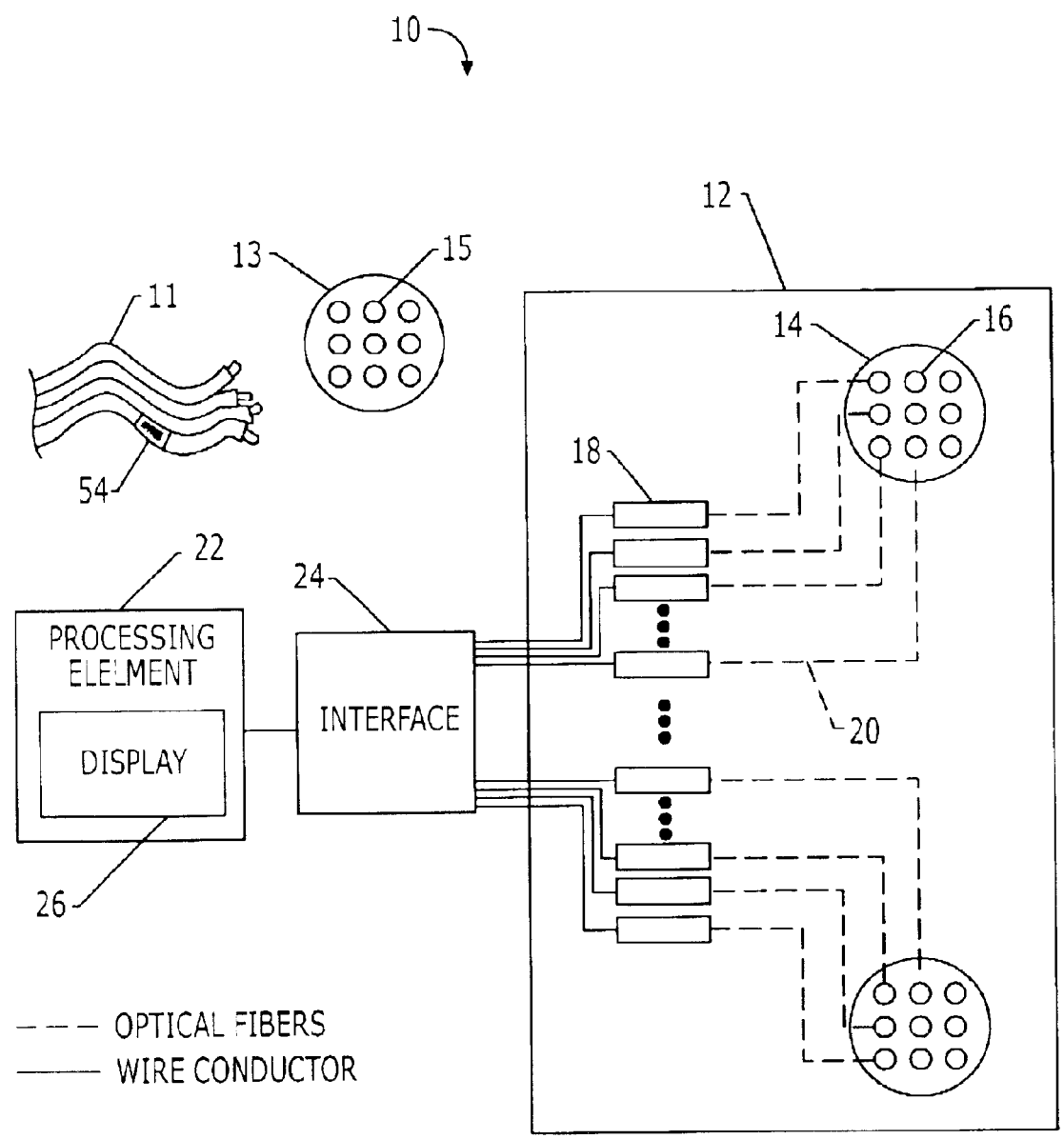
Figure 2A:
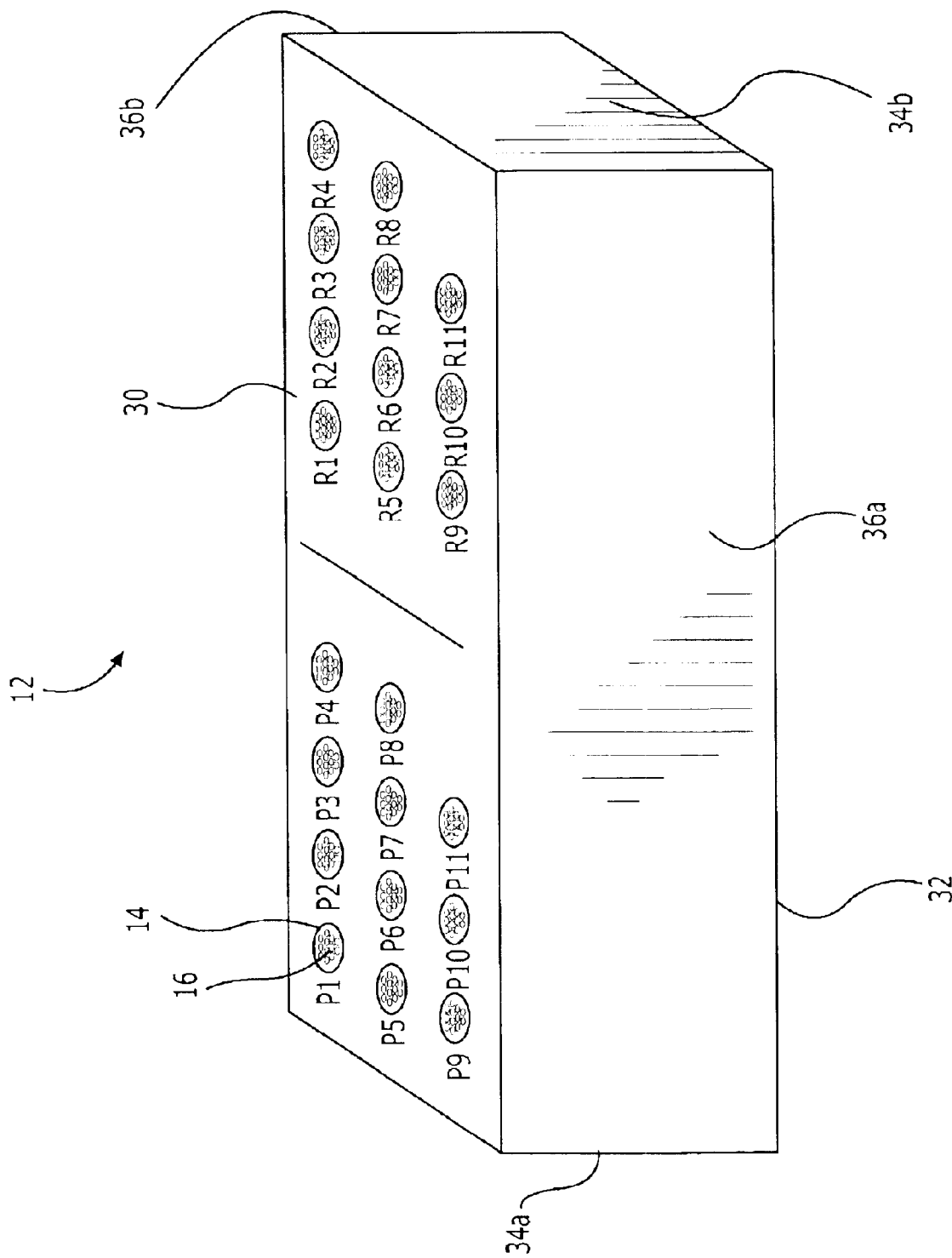
Figure 2B:
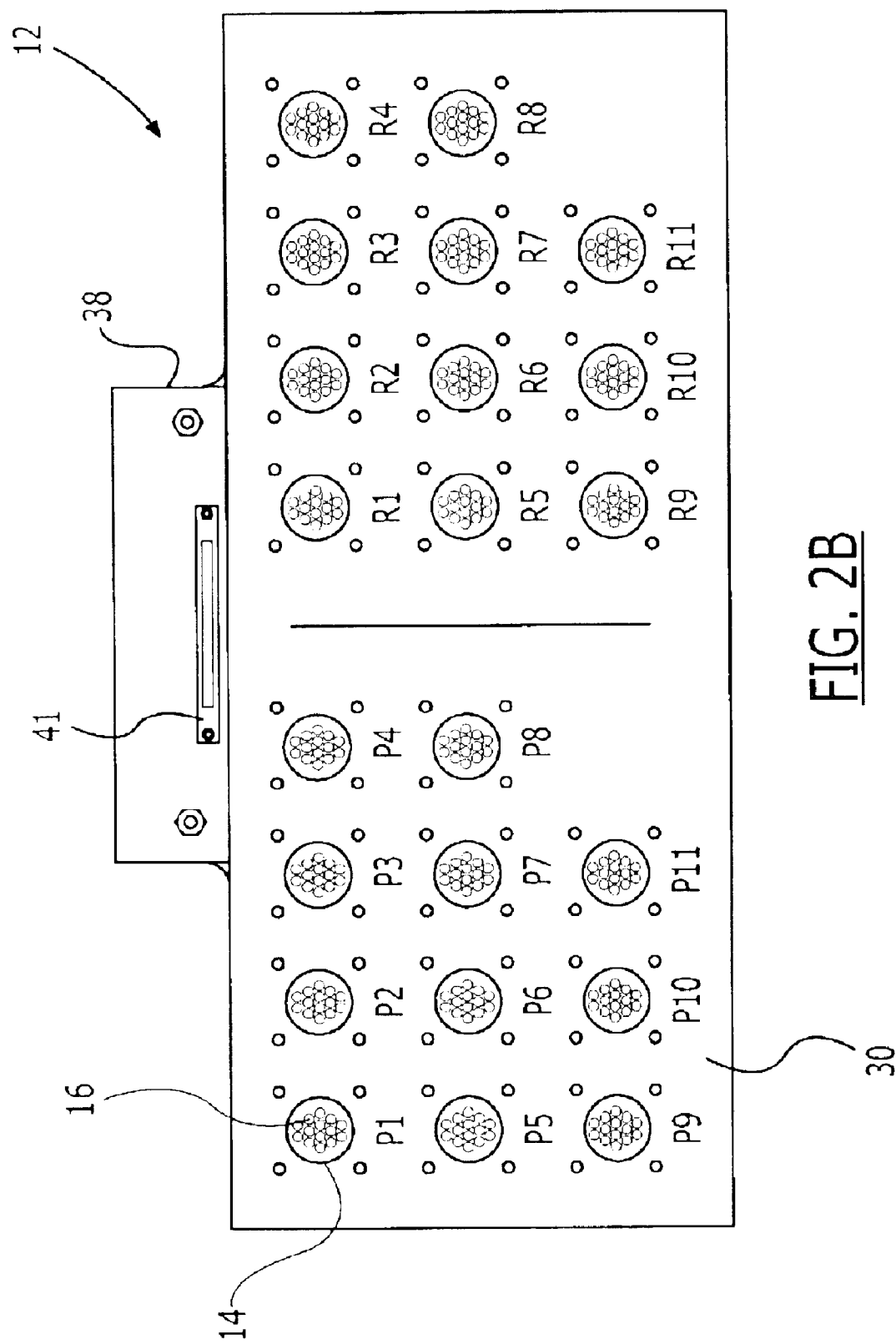
Figure 2C:
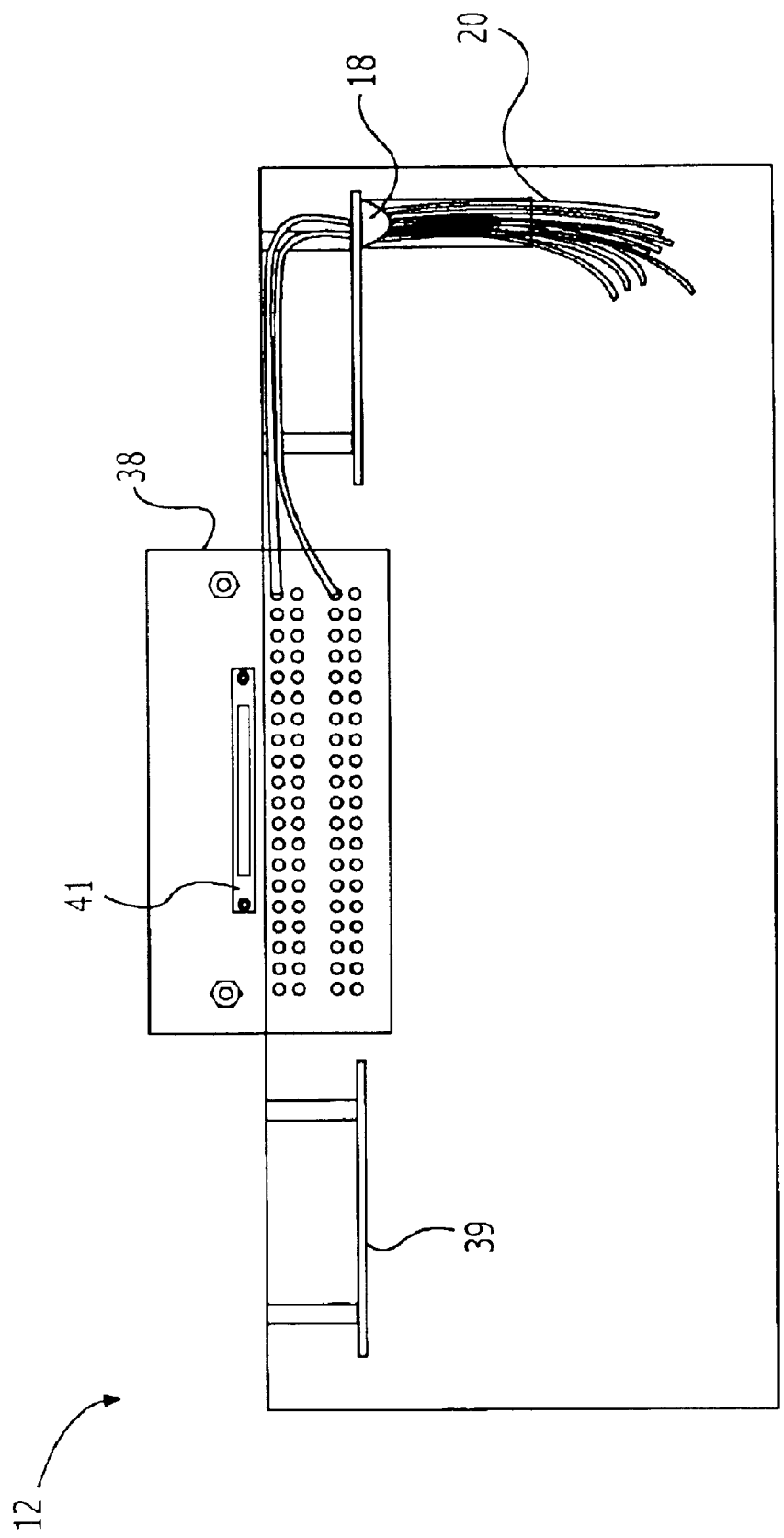
Figure 3A:
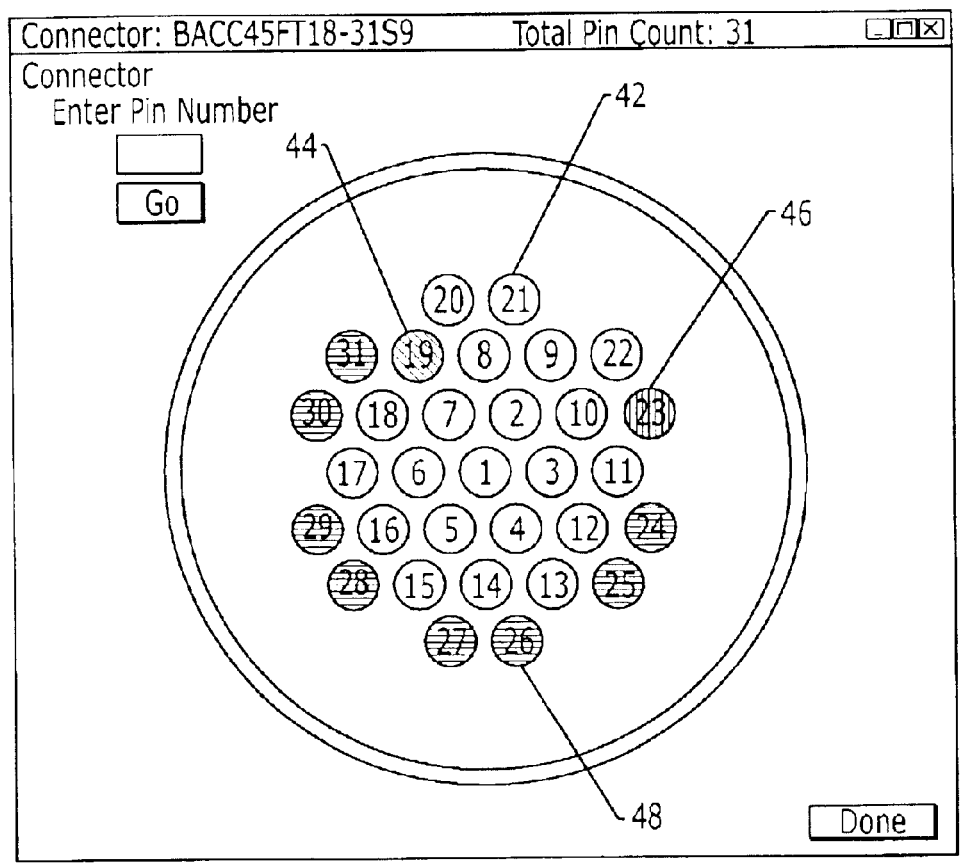
Figure 3B:
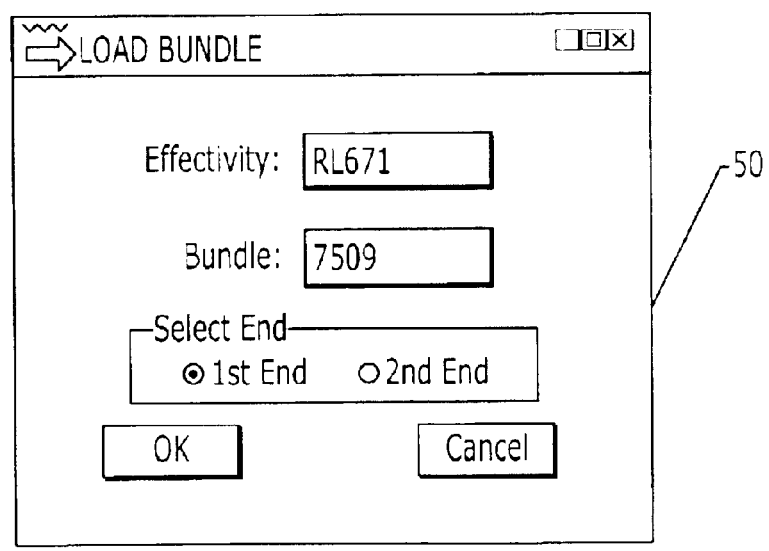
Figure 4A:
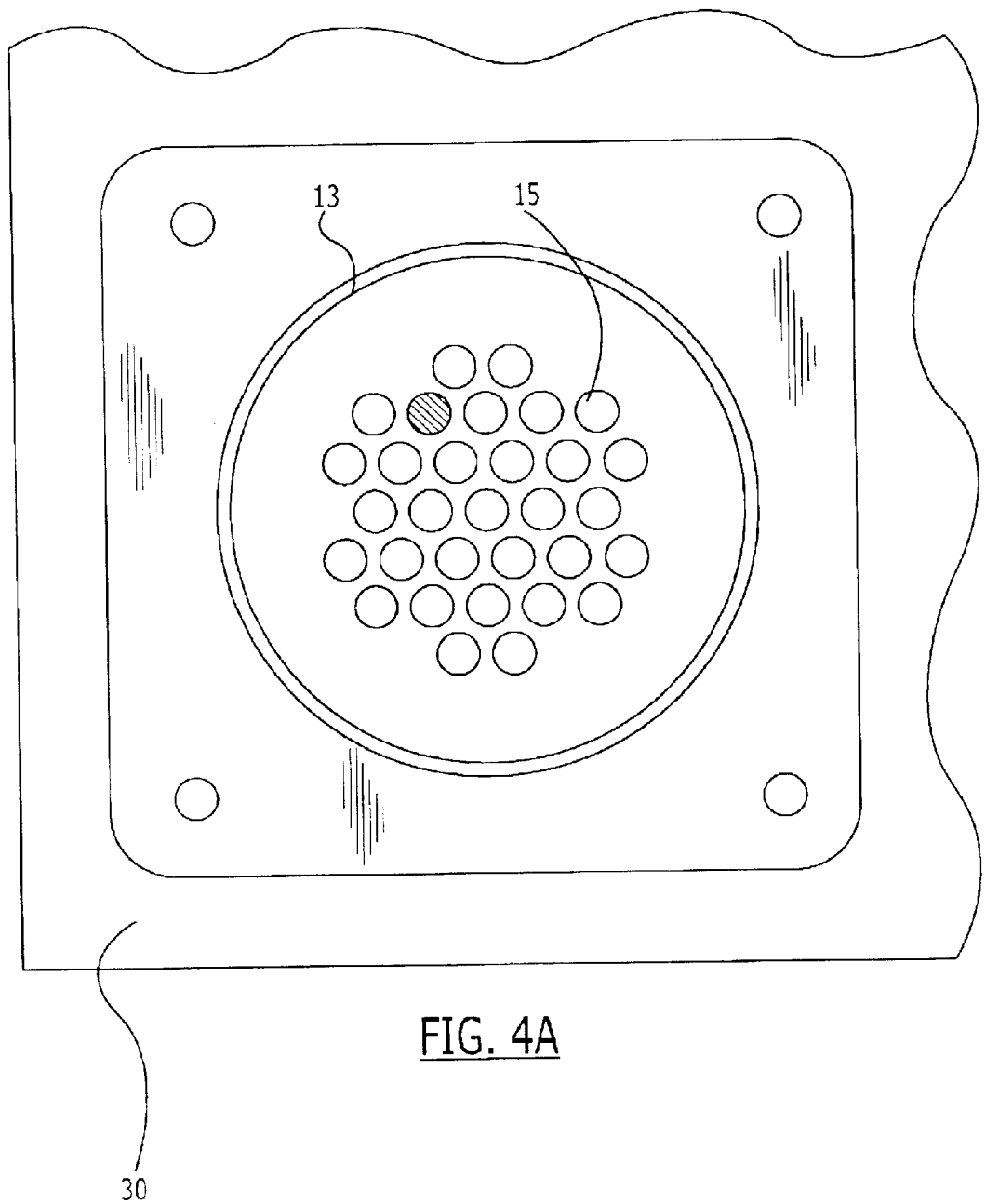
Figure 4B:
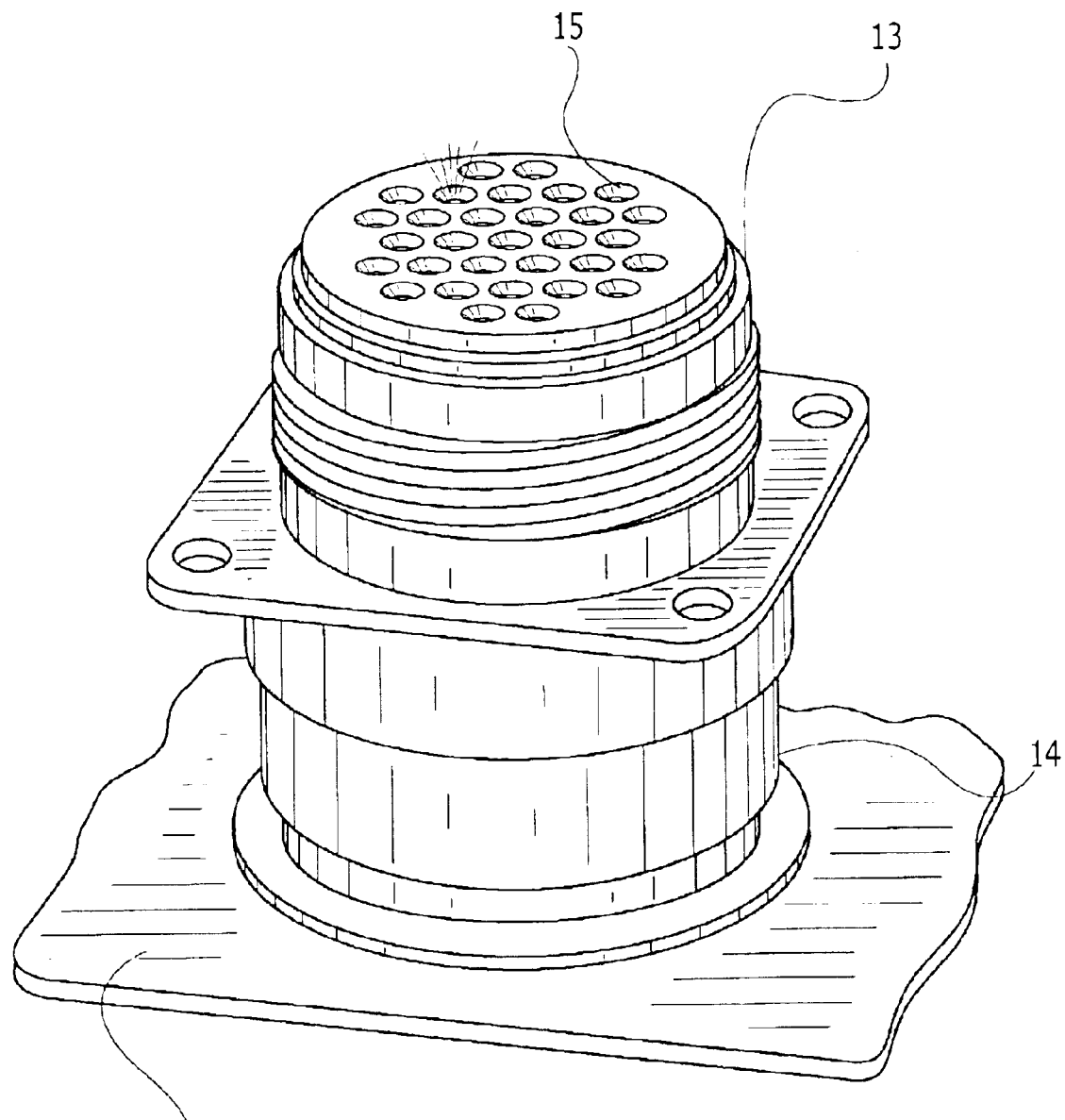

Having thus described the invention in general terms, reference will now be made to the accompanying drawings, which are not necessarily drawn to scale, and wherein:

FIG. 1 is a schematic block diagram of a system for facilitating the assembly of a bundle of conductors into a connector, according to one embodiment of the present invention;

FIG. 2A is a perspective view of an apparatus according to one embodiment of the present invention;

FIG. 2B is a top view of the apparatus of FIG. 2A highlighting a top panel of the apparatus;

FIG. 2C is a top view of the apparatus of FIG. 2A with the top panel removed;

FIG. 2D is a front view of the apparatus of FIG. 2A with a front panel removed;

FIGS. 3A–3D are various displays presented during operation of embodiments of the present invention; and FIGS. 4A and 4B are top and perspective views, respectively, of one of the mating connectors of the apparatus of FIG. 2A with one of the cavities illuminated according to one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, a system 10 is provided for facilitating the assembly of a bundle of conductors 11 into a connector 13 that defines a plurality of cavities 15 for receiving the conductors 11. The conductors 11 can comprise any of a number of different types of conductors capable of conducting electricity (e.g., copper wires). Alternatively, as will be appreciated, the conductors 11 can comprise conductors capable of conducting optical energy (e.g., optical fibers). As shown, the system 10 includes an apparatus 12, such as a workstation, that comprises a plurality of mating connectors 14, at least one of which is capable of being removably coupled to the connector 13, and each of which includes a plurality of cavities 16. In this regard, when the connector 13 is coupled to one of the mating connectors 14, the cavities 15 of the connector 13 are preferably optically coupled to respective cavities 16 of the mating connector 14. The mating connectors 14 can comprise any of a number of different connectors, and preferably comprise a plurality of different connectors such that the system 10 is adapted for use with different types of connector 13. It will also be appreciated, then, that the mating connectors 14 also preferably comprise at least one plug-type mating connector and at least one receptacle-type mating connector, as such are known.

In one embodiment, for example, the apparatus 12 includes mating connectors 14 comprising eleven plug-type mating connectors and eleven receptacle-type mating connectors, all configured according to the Mil-C-26500 specification. In the foregoing example, each plug-type mating connector 14 and each receptacle-type mating connector 14 differ from other plug-type mating connectors and receptacle-type mating connectors, respectively, based upon a shell size and/or the number or arrangement of cavities 16 of the mating connector. Also, for each plug-type mating connector 14, the apparatus 12 preferably includes a corresponding receptacle-type mating connector 14 having the same shell size and number of cavities to facilitate assembling conductors 11 into either a plug-type or receptacle-type connector 13 with each shell size and number of cavities. Further, to facilitate removably coupling the mating connectors 14 to the connector 13, the mating connectors 14 can be configured to not include any minor keyways, as such are known.

To aid a user in assembling the conductors 11 into the connector 13, the apparatus 12 also a plurality of light emitting elements 18, such as light emitting diodes (LEDs), optically coupled to the cavities 16 of the mating connectors 14. The light emitting elements 18 can be optically coupled to the cavities 16 either directly or indirectly but, in a preferred embodiment, the light emitting elements 18 are optically coupled to the cavities 16 via optical fibers 20. As such, the light emitting elements 18 are capable of selectively illuminating at least one of the cavities 16 of the mating connectors. In turn, when the connector 13 is coupled to one of the mating connectors, the light emitting elements 18 are capable of selectively illuminating at least one of the cavities 11 of the connector 13, as the cavities 11 of the connector 13 are optically coupled to corresponding cavities 16 of the mating connector 14.

To control operation of the light emitting elements 18, then, the system 10 includes a processing element 22, which can be electrically connected to the light emitting elements 18 via an interface 24. The processing element 22 can comprise any of a number of different devices, such as a personal computer or other high level processor. Similarly, the interface 24 can comprise any of a number of different devices. For example, the interface 24 can comprise a screw terminal electrically connected to the light emitting elements 18, and a plug-in board electrically connected to the processing element 22, where the screw terminal and the plug-in board are electrically connected via a ribbon cable. In the foregoing example, the screw terminal can comprise a STP-100U model screw terminal, and the plug-in board can comprise a KPCI-3160 model plug-in board, both manufactured by Keithley Instruments, Inc. of Cleveland, Ohio.

Referring now to FIGS. 2A–2D, according to one embodiment, the apparatus 12 includes a top plate 30 and a bottom plate 32 maintained in a spaced, parallel relationship. The apparatus 12 further includes two side plates 34a and 34b maintained in a spaced, parallel relationship, and front and back plates 36a and 36b, respectively, also maintained in a spaced, parallel relationship. In this regard, the top plate 30 and the bottom plate 32, side plates 34a and 34b, and front and back plates 36a and 36b generally define an enclosure, within which the light emitting elements 18 are disposed. The top plate 30 defines a plurality of apertures within which the mating connectors 14 are disposed. In this regard, the cavities 16 of the mating connectors 14 can be selectively optically coupled to the light emitting elements 18 within the enclosure, such as via optical fibers 20. The mating connectors 14 can be arranged in any number of different manners but, in one embodiment, the plug-type mating connectors (designated P1–P11) are disposed on one side of the top plate 30, while the receptacle-type mating connectors (designated R1–R11) are disposed on the opposite side of the top plate 30, as shown in FIG. 2B. It will be appreciated that although the illustrated embodiment includes twenty-two mating connectors, the apparatus 12 can include more or less mating connectors 14 without departing from the spirit and scope of the present invention.

In embodiments where the interface 24 includes a screw terminal 38, a portion of the screw terminal 38 can be disposed within the enclosure of the apparatus 12 such that posts of the screw terminal 38 can be electrically connected to the light emitting elements 18. Also, to facilitate connecting the screw terminal 38 to the plug-in board of the interface 24, the remaining portion of the screw terminal 38 can extend outside of the enclosure, such as by extending the portion out from the back plate 36b of the enclosure. Along one of the plates of the enclosure, the apparatus 12 can include banks of light emitting elements 18 arranged on panels 39, where the light emitting elements 18 are optically coupled to the cavities 16 of the mating connectors 14 via optical fibers 20. For example, as shown, two banks of light emitting elements 18 can be arranged on panels 39, each shown to include one light emitting element 18 for purposes of clarity. In the illustrated embodiment, the light emitting elements 18 of one bank are optically coupled to the cavities 16 of the plug-type mating connectors 14, and the light emitting elements 18 of the other bank are optically coupled to the cavities 16 of the receptacle-type mating connector 14.

Each light emitting element 18 can be optically coupled to a respective cavity 16 of a mating connector 14, such as via a dedicated optical fiber, such that that the apparatus 12 includes a number of light emitting elements 18 equal to the total number of cavities 16 of the mating connectors 14. It will be appreciated, however, that the total number of cavities 16 can number in the hundreds. As such, in one advantageous embodiment, each light emitting diode is optically coupled to a plurality of cavities 16 of a plurality of mating connectors 14. Thus, a plurality of optical fibers 20 may extend from one light emitting element 18 to respective cavities 16 in different ones of the mating connectors 14. However, no two cavities 16 of the same mating connector 14 are optically coupled to the same light emitting element 18. For example, each light emitting element 18 of one bank can be optically coupled to one cavity 16 of most, if not all, of either the plug-type or receptacle-type mating connectors 14, with the light emitting elements 18 of the other bank similarly optically coupled to the cavities 16 of the other type of mating connectors 14. Thus, it will be appreciated that by illuminating a cavity 16 of one of the mating connectors 14 will also result in illumination of a cavity 16 of other mating connectors 14. As such, to prevent the illumination of the other cavities 16 from distracting the user, mating connectors 14 not coupled to the connector 13 can be covered, such as by a cap.

In addition to being optically connected to cavities 16 of the mating connectors 14, each light emitting element 18 is electrically connected to a post of the screw terminal 38 of the interface 24. In this regard, each light emitting element 18 can be referenced to a respective post of the screw terminal 38. The posts of the screw terminal 38, then, are electrically connected to a connector 41, which is capable of being electrically connected to the plug-in board (not shown) of the interface 24, such as via a ribbon cable (not shown).

Again referring to FIG. 1, to further facilitate assembling the conductors 11 into the connector 13, the processing element 22 may drive a display 26, such as a viewing screen, monitor or the like, capable of indicating the cavity 15 being illuminated. In this regard, reference is now drawn to FIGS. 3A–3D, which illustrate exemplar presentations of the display 26. As shown in FIG. 3A, the display 26 can be capable of displaying a graphical representation 40 of the connector 13 (or the mating connector 14 coupled to the connector 13), including graphical representations 42 of the respective cavities 15 and indicating any cavities 15 currently being illuminated 44 by a light emitting element 18. Also, the display 26 can be further capable of indicating cavities 15 including a previously plugged conductor 46, i.e., cavities 15 in which conductors 11 have been previously inserted, and/or cavities 15 including filler plugs 48 (described below). The display 26 can present the different cavities 15 in any one of a number of different manners, such as by presenting the different cavities 15 in different colors and/or by applying different visual effects to the different cavities 15. For example, the display 26 can present the cavities illuminated 44 and the cavities including a previously plugged conductors 46 in a different color than the cavities having filler plugs 48. In turn, the cavities illuminated 44 can be distinguished from the cavities including previously plugged conductors 46 by presenting the cavities illuminated 44 in a flashing manner.

In operation, a method of assembling the conductors 11 into the connector 13 generally begins by removably coupling a connector 13 to a mating connector 14 on the apparatus 12. In this regard, the connector 13 is coupled to an opposite type mating connector 14 having the same shell size and number and arrangement of cavities as the connector 13. For example, if the connector 13 comprises a plug-type connector having a shell size of 16 and 24 cavities, the connector 13 is coupled to a receptacle-type mating connector also having a shell size of 16 and 24 cavities. It should be noted that, as described, the connector 13 is coupled to the mating connector 14 before illumination of the cavities 15 of the connector 13. In this regard, the connector 13 can be coupled to the mating connector 14 at any time prior to plugging the conductors 11 into the connector 13 without departing from the spirit and scope of the present invention.

To continue assembling the conductors 11 into the connector 13, the processing element 22 receives a selection of a conductor 11 and thereafter illuminates a corresponding cavity 15 of the connector 13 to thereby assist the user in plugging the selected conductor into the illuminated cavity 15. In this regard, processing element 22 can direct the display 26 to present a user with a form field 50, and example of which is shown in FIG. 3B. From the form field 50, then, the user can identify a bundle of conductors 11 to be assembled into the connector 13, such as by identifying the effectivity and bundle number of the respective bundle. The user can also identify the type of connector 13, such as by identifying either the first or second end of the bundle of conductors 11. The processing element 22 receives the identification information and can thereafter present on the display 26 a listing 52 of different connectors associated with the respective bundle, an example of such a listing being shown in FIG. 3C. It will be appreciated, however, that the processing element 22 need not present the listing 52 of different connectors. In such an embodiment, for example, the processing element 22 can receive a selection of the connector 13 via the form field 50 presented on the display 26.

Upon selecting the connector 13, such as from the listing 52 of connectors, the processing element 22 can display a listing 54 of the conductors 11 in the previously identified bundle along with the numbers of the cavities 15 of the selected connector 13, an example of which is illustrated in FIG. 3D. The user can then select a conductor 11 from the listing 54 of conductors 11. Similar to the listing 52 of connectors, it will also be appreciated that the processing element 22 need not present the listing 54 of conductors 11, as the processing element 22 can alternatively directly receive a selection of a conductor 11. For example, the user can enter a conductor identifier, such as a wire number, directly into the processing element 22 via any of a number of known methods. Upon receipt of the selected conductor 11, then, the processing element 22 identifies the light emitting element 18 optically coupled to the cavity 15 associated with the selected conductor 11 and actuates the light emitting element 18 to thereby illuminate the respective cavity 15, as shown in FIGS. 4A and 4B.

As the cavity 15 is illuminated, the processing element 22 can direct the display 26 to present the graphical representation of the connector 40 and indicate the cavity being illuminated 44, such as by presenting a graphical representation similar to that illustrated in FIG. 3A. It will be appreciated that the display 26 can alternatively present the listing 54 of the conductors 11 and the graphical representation of the connector 40, or the display 26 can present both the listing 54 and the graphical representation 40 concurrently. By presenting the listing 54 and the graphical representation 40 concurrently, the user can easily view the listing 54 including the selected conductor along side the graphical representation 40 indicating the cavity 15 to be plugged with the selected conductor 11. As the processing element 22 illuminates the cavity 15 of the connector 13, the user can select the respective conductor 11 from the bundle of conductors. By illuminating the cavity 15 and presenting the graphical indication of the illuminated cavity 44, the user can then easily plug and secure the selected conductor into the illuminated cavity 15.

Once the conductor 11 is secured into the illuminated cavity 15, the user can select another conductor 11 from the listing and the process can repeat with the processing element 22 controlling the light emitting elements 18 to illuminate respective cavities 15 of the connector 13 to assist the user in plugging the conductors 11 into the cavities 15. And as the user selects other cavities 15, the indication presented by the display 26 can change to provide a real-time indication of the cavity 15 illuminated, as well as the cavities 15 previously plugged with conductors 11 and the cavities 15 including filler plugs. Finally, when all of the conductors 11 have been assembled into the cavities 15 of the connector 13, the connector 13 can be removed from the mating connector 14 and any steps required to completely assemble the connector 13 can be performed. For example, if the connector 13 were coupled to the mating connector 14 without a housing, the connector 13 can be removed from the mating connector 14 and the housing attached to the connector 13.

As stated above, the display 26 is capable of identifying cavities 15 of the connector 13 that include filler plugs. In this regard, as is known to those skilled in the art, in some cases the number of cavities 15 in the connector 13 is greater than the number of conductors 11 to be assembled into the connector 13. Thus, it may be desirable to seal the cavities 15 that are not occupied by conductors 11, such as by using filler plugs of synthetic polymer material or the like. In such cases, typically before assembling the conductors 11 into the connector 13, the user can assemble the filler plugs into the cavities 15 that will not be occupied by conductors 11. The user can assemble the filler plugs in any one of a number of different manners but, in one preferred embodiment, the filler plugs are assembled into the connector 13 in the same manner as the conductors 11, as described above. In this regard, the processing element 22 can identify the light emitting elements 18 coupled to the cavities 15 to receive the filler plugs to thereby illuminate the respective cavities 15 in any one of a number of manners. For example, having previously identified the connector 13 (as described above), the processing element 22 can identify the cavities 15 to receive filler plugs as all cavities 15 not associated with conductors 11 of the previously identified bundle of conductors 11 (as described above).

It will be appreciated that although the user is described as selecting a conductor 11 from the listing 52 of conductors 11 before selecting the conductor from the bundle, the user can select the conductor from the bundle and thereafter identify and select the conductor from the listing. In this regard, the conductors 11 can include identifying labels 54 (one of which is shown in FIG. 1), such as barcodes or optical character recognizable (OCR) text, capable of being read and interpreted by the processing element 22 according to known methods, to thereby select the conductor from the bundle. As such, the system 10 can reduce human errors caused by selecting a conductor from the bundle, then erroneously selecting a different conductor from the listing of conductors 11.

Therefore, embodiments of the present invention provide an improved system and method for assembling a bundle of conductors into a connector. Advantageously, the system and method provide an apparatus that includes a plurality of mating connectors and, as such, assembling different connectors does not require reconfiguring the apparatus, such as by providing adapters for different connectors. Also, as the cavities of the mating connectors are optically coupled to a plurality of light emitting elements, the system and method do not require any moving parts, such as a servo-motor, to selectively illuminate the cavities. Further, in addition to illuminating a cavity to be plugged with a respective conductor, the system and method of embodiments of the present invention also provide a display capable of indicating the respective cavity.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for facilitating the assembly of a bundle of conductors into a connector that defines a plurality of cavities for receiving the conductors, said system comprising:

a plurality of mating connectors that each define a plurality of cavities, wherein the connector is capable of being removably coupled to one of said mating connectors, wherein coupling the connector to the mating connector optically couples the cavities of the mating connector with the cavities of the connector; and a plurality of light emitting elements optically coupled to the cavities of said mating connectors, wherein said light emitting elements are capable of selectively illuminating at least one of the cavities of said mating connectors; and a processing element adapted to control said light emitting elements to selectively illuminate at least one of the cavities of said mating connectors to thereby illuminate at least one corresponding cavity of the connector to facilitate plugging at least one associated conductor into the at least one illuminated cavity of the connector.

2. A system according to claim 1, wherein said apparatus further comprises a plurality of optical fibers capable of optically coupling the cavities of said mating connectors with said light emitting elements.

3. A system according to claim 1, wherein said mating connectors include at least one plug mating connector and at least one receptacle mating connector, wherein the connector is selected from a group consisting of a plug connector and a receptacle connector, and wherein the plug mating connector is capable of being removably coupled to a receptacle connector and the receptacle mating connector is capable of being removably coupled to a plug connector.

4. A system according to claim 1, wherein said mating connectors include at least two connectors of different types, wherein the connector is capable of being removably coupled to the mating connector of the same type as the connector.

5. A system according to claim 1 further comprising a display capable of being driven by said processing element to thereby indicate the at least one cavity being illuminated.

6. A system according to claim 5, wherein said processing element is capable of driving said display to present a graphical representation of the connector including the cavities and indicating the at least one cavity being illuminated.

7. A system according to claim 6, wherein said processing element is further capable of driving said display to indicate at least one of at least one cavity including a previously plugged conductor and at least one cavity including a filler plug.

8. A system according to claim 1, wherein said processing element is capable of receiving a selection of a conductor and thereafter illuminating a corresponding cavity of the connector to thereby facilitate plugging the selected conductor into the illuminated cavity.

9. A system according to claim 8 further comprising a display capable of being driven by said processing element, wherein said processing element is capable of driving said display to present a listing of the conductors and associated cavities of the connector such that said processing element can receive the selection from the listing.

10. A system according to claim 8, wherein said processing element is capable of receiving an identification of the bundle of conductors and thereafter driving said display to present the listing of conductors and associated cavities based upon the identified bundle.

11. A method of assembling a bundle of conductors into a connector that defines a plurality of cavities for receiving the conductors, said method comprising:
providing an apparatus comprising:
a plurality of mating connectors that each define a plurality of cavities, wherein the connector is capable of being removably coupled to one of said mating connectors; and
a plurality of light emitting elements optically coupled to the cavities of said mating connectors;
removably coupling the connector to one of the mating connectors, wherein coupling the connector to the mating connector optically couples the cavities of the mating connector with corresponding cavities of the connector;
selecting one of the plurality of conductors;
illuminating a cavity of the mating connector to thereby illuminate the corresponding cavity of the connector, wherein the cavity illuminated is based upon the conductor selected;
displaying an indication of the cavity being illuminated; and
plugging the selected conductor into the illuminated cavity of the connector,
wherein the selecting, illuminating and displaying steps occur for each conductor of the bundle.

12. A method according to claim 11, wherein providing an apparatus comprises providing an apparatus comprising a plurality of mating connectors including at least one plug mating connector and at least one receptacle mating connector, wherein the connector is selected from a group consisting of a plug connector and a receptacle connector, and wherein removably coupling the connector comprises removably coupling the connector to a plug mating connector when the connector comprises a receptacle connector and removably coupling the connector to a receptacle mating connector when the connector comprises a plug connector.

13. A method according to claim 11, wherein providing an apparatus comprises providing an apparatus comprising a plurality of mating connectors including at least two connectors of different types, and wherein removably coupling the connector comprises removably coupling the connector to a mating connector of the same type as the connector.

14. A method according to claim 11, wherein displaying an indication comprises displaying a graphical representation of the connector including the cavities and indicating the at least one cavity being illuminated.

15. A method according to claim 14, wherein displaying an indication further comprises displaying an indication at least one of at least one cavity including a previously plugged conductor and at least one cavity including a filler plug.

16. A method according to claim 11 further comprising displaying a listing of the conductors and associated cavities of the connector and thereafter identifying the conductor selected from the listing, wherein displaying the listing occurs before illuminating the cavity, and wherein illuminating the cavity is based upon the conductor identified from the listing.

17. A method according to claim 16 further comprising identifying the bundle of conductors, and wherein displaying a listing comprises displaying a listing based upon the bundle identified.

18. A system for facilitating the assembly of a bundle of conductors into a connector that defines a plurality of cavities for receiving the conductors, said system comprising:
a display;
a plurality of mating connectors that each define a plurality of cavities, wherein the connector is capable of being removably coupled to one of said mating connectors, wherein coupling the connector to the mating connector optically couples the cavities of the mating connector with the cavities of the connector; and
a processing element capable of driving said display, wherein said processing element is capable of receiving a selection of a conductor and thereafter driving said display to present an indication of a corresponding cavity of the connector to thereby facilitate plugging the selected conductor into the corresponding cavity, and wherein the processing element is also capable of controlling a plurality of light emitting elements optically coupled to the cavities of said mating connectors to selectively illuminate at least one of the cavities of said mating connectors to thereby illuminate at least one corresponding cavity of the connector to facilitate plugging at least one associated conductor into the at least illuminated cavity of the connector.

19. A system according to claim 18, wherein said processing element is capable of driving said display to present a graphical representation of the connector including the cavities and indicating the corresponding cavity.

20. A system according to claim 19, wherein said processing element is further capable of driving said display to indicate the corresponding cavity and at least one cavity including a previously plugged conductor.

21. A system according to claim 20, wherein said processing element is further capable of driving said display to indicate the corresponding cavity and at least one cavity including a filler plug.

22. A system according to claim 18, wherein said processing element is capable of driving said display to present a listing of the conductors and associated cavities of the connector such that said processing element can receive the selection from the listing.

23. A system according to claim 22, wherein said processing element is capable of receiving an identification of the bundle of conductors and thereafter driving said display to present the listing of conductors and associated cavities based upon the identified bundle.

* * * * *